US010187189B2

(12) United States Patent
John Wilson et al.

(10) Patent No.: US 10,187,189 B2
(45) Date of Patent: Jan. 22, 2019

(54) REFERENCE SIGNAL PLACEMENT WITHIN DIFFERENT SUBBANDS OF THE SAME OFDM SYMBOL

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/713,566

(22) Filed: Sep. 22, 2017

(65) Prior Publication Data

US 2018/0205507 A1 Jul. 19, 2018

Related U.S. Application Data

(60) Provisional application No. 62/446,343, filed on Jan. 13, 2017.

(51) Int. Cl.
*H04L 5/00* (2006.01)
*H04W 48/10* (2009.01)
*H04W 48/12* (2009.01)

(52) U.S. Cl.
CPC ............ *H04L 5/005* (2013.01); *H04L 5/0051* (2013.01); *H04W 48/10* (2013.01); *H04L 5/0007* (2013.01); *H04L 5/0073* (2013.01); *H04W 48/12* (2013.01)

(58) Field of Classification Search
None
See application file for complete search history.

(56) References Cited

U.S. PATENT DOCUMENTS

| 8,305,987 B2 | 11/2012 | Fong et al. |
| 9,544,776 B2 | 1/2017 | Luo et al. |
| 2010/0254471 A1* | 10/2010 | Ko ........................ H04L 5/0023 375/260 |

(Continued)

OTHER PUBLICATIONS

International Search Report and Written Opinion—PCT/US2018/013125—ISA/EPO—dated Mar. 15, 2018.

(Continued)

*Primary Examiner* — Kodzovi Acolatse
(74) *Attorney, Agent, or Firm* — Arent Fox LLP

(57) ABSTRACT

Aspects provide a way for RS in different sub-bands within the same OFDM symbol to have different RS placement designs, e.g., different dependence/independence on cell ID. A base station apparatus transmits a first RS in a first resource set using a first RS placement, wherein the first resource set comprises a first subband of an OFDM symbol. The apparatus also transmits a second RS in a second resource set using a second RS placement, wherein the second resource set comprises a second subband of the OFDM symbol. A UE apparatus identifies a first resource set comprising a first subband in a plurality of subbands of an OFDM symbol transmitted by base station, determines whether a RS tone location utilized with the first subband is dependent upon an identifier of the base station, and receives the RS based on a result of the determining.

29 Claims, 14 Drawing Sheets

(56) References Cited

U.S. PATENT DOCUMENTS

| | | | |
|---|---|---|---|
| 2010/0260154 A1 | 10/2010 | Frank et al. | |
| 2011/0194551 A1* | 8/2011 | Lee | H04B 7/0626 |
| | | | 370/342 |
| 2011/0216842 A1* | 9/2011 | Zhang | H04L 5/0051 |
| | | | 375/260 |
| 2013/0039199 A1* | 2/2013 | Liao | H04W 72/085 |
| | | | 370/252 |
| 2013/0039349 A1* | 2/2013 | Ebrahimi Tazeh Mahalleh | |
| | | | H04L 1/0013 |
| | | | 370/336 |
| 2013/0083681 A1* | 4/2013 | Ebrahimi Tazeh Mahalleh | |
| | | | H04L 5/0057 |
| | | | 370/252 |
| 2013/0182799 A1* | 7/2013 | Geirhofer | H04W 56/00 |
| | | | 375/340 |
| 2013/0194943 A1* | 8/2013 | Davydov | H04W 4/70 |
| | | | 370/252 |
| 2013/0223373 A1 | 8/2013 | Damnjanovic et al. | |
| 2013/0308555 A1* | 11/2013 | Ho | H04L 5/0048 |
| | | | 370/329 |
| 2014/0092826 A1* | 4/2014 | Eriksson | H04W 72/042 |
| | | | 370/329 |
| 2014/0198675 A1* | 7/2014 | He | H04L 5/0048 |
| | | | 370/252 |
| 2016/0173244 A1 | 6/2016 | Ding | |
| 2016/0182201 A1 | 6/2016 | Jiang et al. | |

OTHER PUBLICATIONS

Nokia et al., "NR-PBCH Design", 3GPP Draft; R1-1701060, 3rd Generation Partnership Project (3GPP), Mobile Competence Centre, 650, Route Des Lucioles, F-06921 Sophia-Antipolis Cedex, France, vol. RAN WG1, No. Spokane, U.S.A, Jan. 16, 2017-Jan. 20, 2017 Jan. 9, 2017, XP051202363, Retrieved from the Internet: URL:http://www.3gpp.org/ftp/tsg_ran/WG1_RL1/TSGR1_AH/NR_AH_1701/Docs/ [retrieved on Jan. 9, 2017], 7 pages.

QUALCOMM Europe: "Details of CSI-RS", 3GPP TSG-RAN WG1 #59, R1-094867, 3rd Generation Partnership Project (3GPP), Mobile Competence Centre, 650, Route Des Lucioles, F-06921 Sophia-Antipolis Cedex, France, vol. RAN WG1, No. Jeju, Korea; Nov. 9-13, 2009, Jeju, Korea, pp. 1-6.

\* cited by examiner

REFERENCE SIGNAL PLACEMENT WITHIN DIFFERENT SUBBANDS OF THE SAME OFDM SYMBOL

CROSS-REFERENCE TO RELATED APPLICATION

This application claims the benefit of U.S. Provisional Application Ser. No. 62/446,343, entitled "REFERENCE SIGNAL PLACEMENT WITHIN DIFFERENT SUBBANDS OF THE SAME OFDM SYMBOL" and filed on Jan. 13, 2017, which is expressly incorporated by reference herein in its entirety.

BACKGROUND

Field

The present disclosure relates generally to communication systems, and more particularly, to reference signal (RS) placement.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 5G or NR wireless communications, within one OFDM symbol, there may be multiple resource sets located in different subbands of a control region. Aspects presented herein provide RS placement design to be different for different resource sets on different subband within the same OFDM symbol.

In an aspect, the present disclosure includes a method of wireless communications at an base station, the method including transmitting a first RS in a first resource set using a first RS placement, wherein the first resource set comprises a first subband of an OFDM symbol and transmitting a second RS in a second resource set using a second RS placement, wherein the second resource set comprises a second subband of the OFDM symbol. In one example, the first and second RS may comprise a common reference signal (CRS) and/or a UE specification RS (UE-RS). In another example, the first and second RS may comprise a physical broadcast channel (PBCH) RS and a physical downlink shared channel (PDSCH) demodulation reference signal (DMRS).

In another aspect, the present disclosure includes a method of wireless communications at a UE, the method including identifying a first resource set comprising a first subband in a plurality of subbands of an OFDM symbol transmitted by a base station, determining whether a RS tone location utilized with the first control resource set is dependent upon an identifier of the base station, and receiving the RS based on a result of the determining. In one example, the first and second RS may comprise a common reference signal (CRS) and/or a UE specification RS (UE-RS). In another example, the first and second RS may comprise a physical broadcast channel (PBCH) RS and a physical downlink shared channel (PDSCH) demodulation reference signal (DMRS).

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
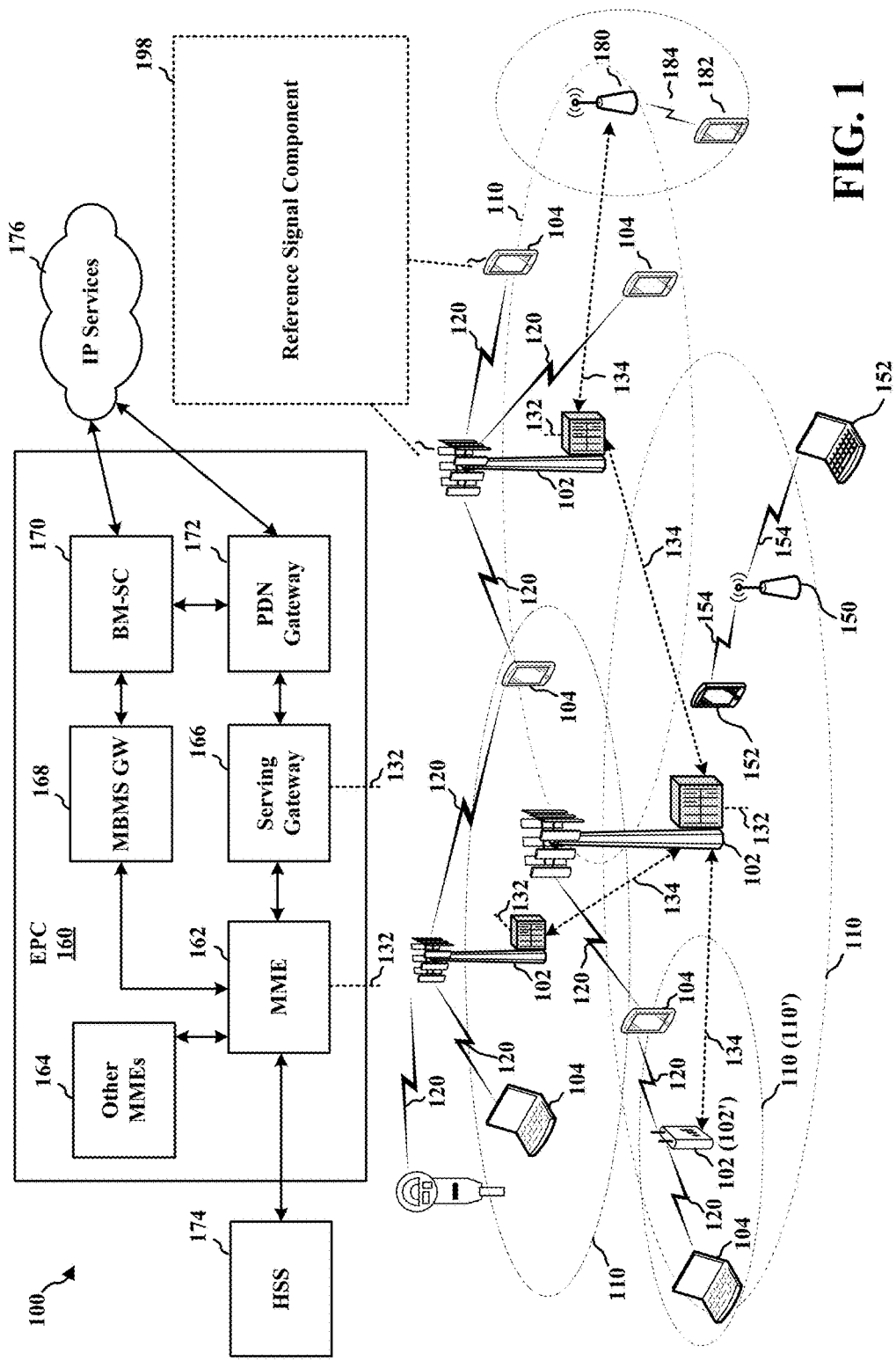
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 1052 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies.

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 102 may comprise a reference signal component 198 that receives/transmits reference signals using different resource sets, wherein the reference signals in different resource sets may have different dependence/independence from a cell ID.

Figure 2:
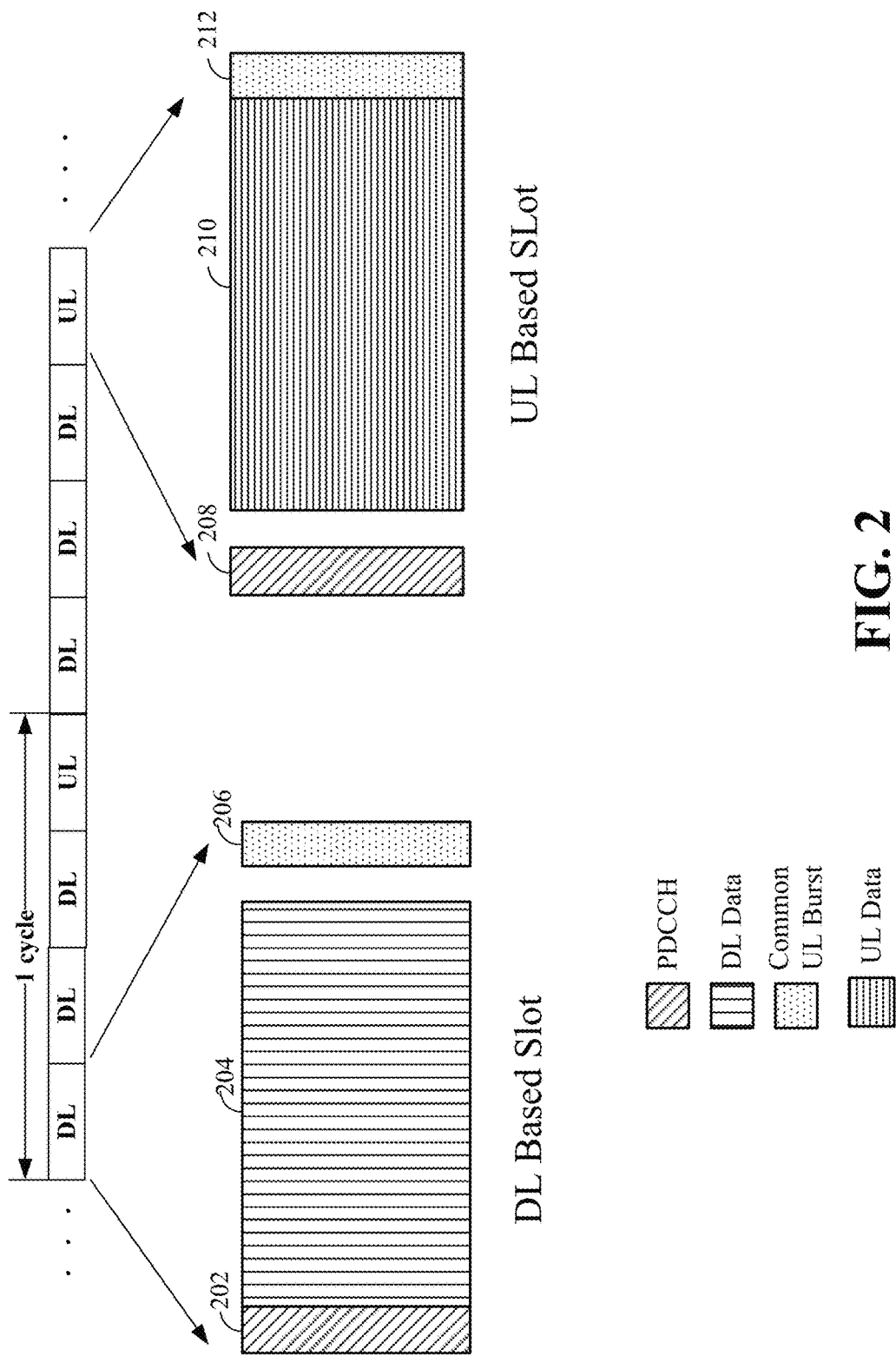
FIG. 2 is a diagram illustrating an OFDM symbol structure.

FIG. 2 illustrates a frame structure comprising DL and UL based slots.

The frame (10 ms) may be divided into slots. A resource grid may be used to represent the time slots, each time slot including one or more time concurrent resource blocks (RBs) (also referred to as physical RBs (PRBs)). The resource grid may be divided into multiple resource elements (REs). The number of bits carried by each RE depends on the modulation scheme.

Figure 12:
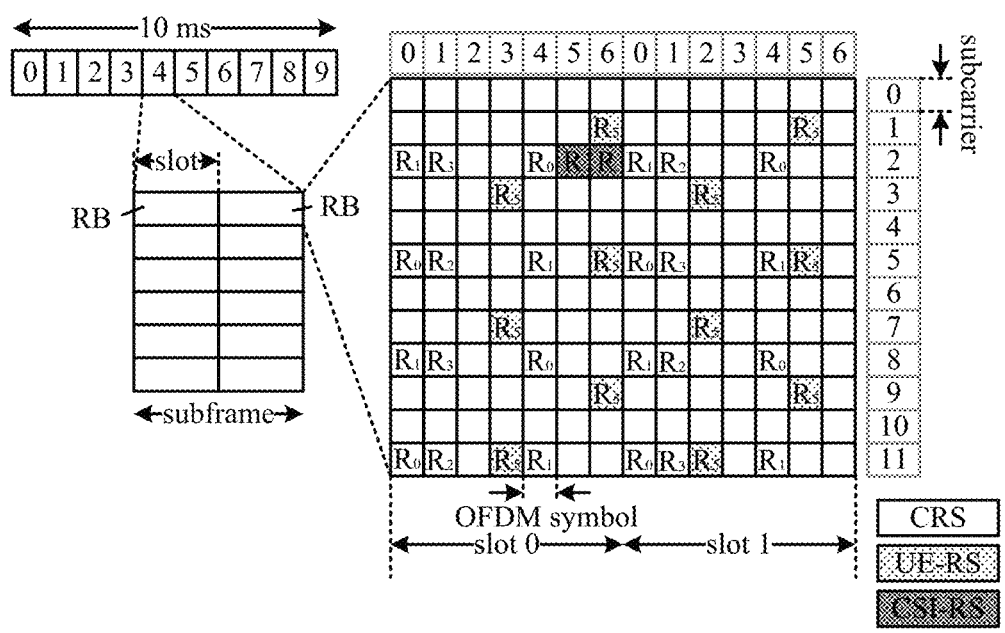
FIG. 12 illustrates example RS patterns.

Some of the REs may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 12 illustrates an example pattern for CRS, UE-RS, CSI-RS. For example, a DL based slot may comprise a DL control region 202, e.g., in which physical downlink control channel (PDCCH) is transmitted. Similarly, an UL slot may comprise a PDCCH portion 208. A UE may be configured with a UE-specific enhanced PDCCH (ePDCCH). A physical broadcast channel (PBCH) may carry a master information block (MIB). The MIB provides a number of RBs in the DL system bandwidth, a PHICH configuration, and a system frame number (SFN). The DL based slot may comprise a DL data region 204, e.g., in which a physical downlink shared channel (PDSCH) carries user data, broadcast system information not transmitted through the PBCH such as system information blocks (SIBs), and paging messages. The DL based slot may also comprise a common UL burst region 206 in which UL control channel information or other time sensitive or otherwise critical UL transmissions may be sent within the DL based slot.

For example, the UE may additionally transmit sounding reference signals (SRS). The SRS may be used by an eNB for channel quality estimation to enable frequency-dependent scheduling on the UL. A physical random access channel (PRACH) may be within one or more slots within a frame based on the PRACH configuration. The PRACH allows the UE to perform initial system access and achieve UL synchronization. Additionally, the common UL burst may comprise a physical uplink control channel (PUCCH) that carries uplink control information (UCI), such as scheduling requests, a channel quality indicator (CQI), a precoding matrix indicator (PMI), a rank indicator (RI), and HARQ ACK/NACK feedback.

Similar to the DL based slot, the UL based slot may comprise a DL control region 208, e.g., for PDCCH transmissions. The UL based slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL based slot may also comprise a common UL burst region 212 similar to the DL based slot.

Figure 3:
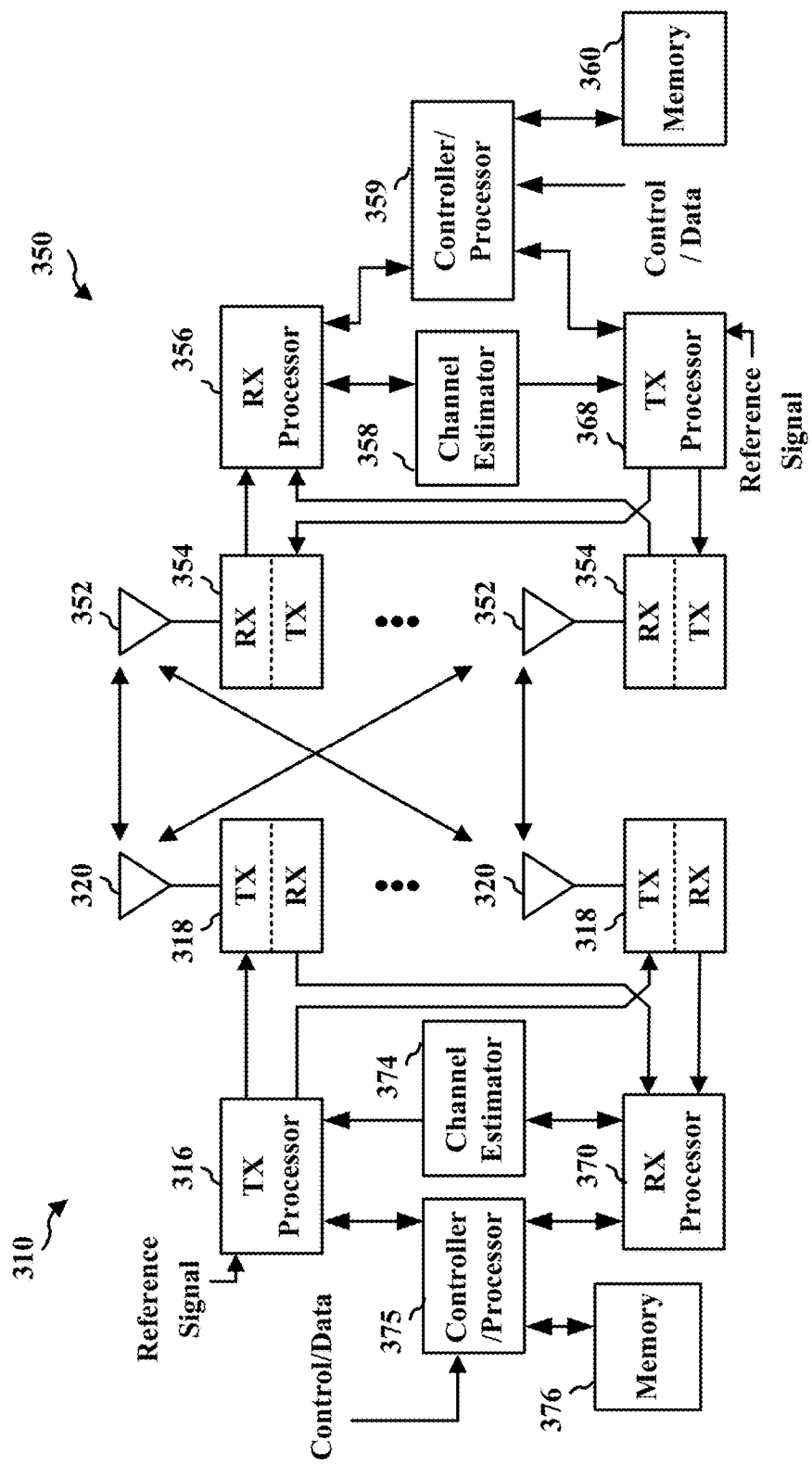
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
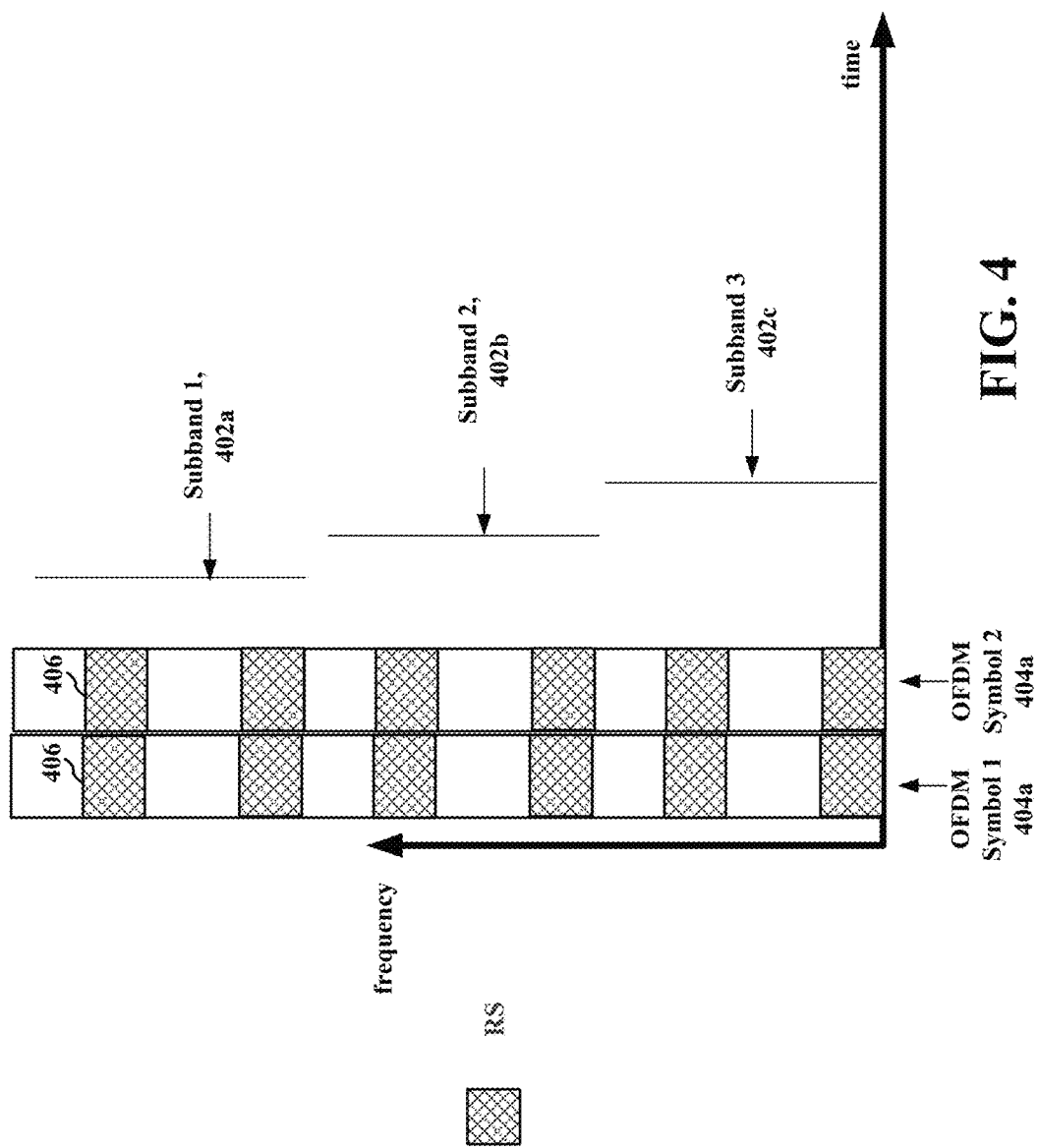
FIG. 4 is a diagram illustrating an example frame structure having multiple subbands within an OFDM symbol.

In 5G or NR wireless communications, within one OFDM symbol, there may be resource sets located in different subbands. FIG. 4 illustrates an example frame structure 400 having multiple subbands 402*a*, 402*b*, 402*c* within an OFDM symbol 404*a*, 404*b*. RS 406 may be transmitted in different subbands of the corresponding OFDM symbol.

Figure 5:
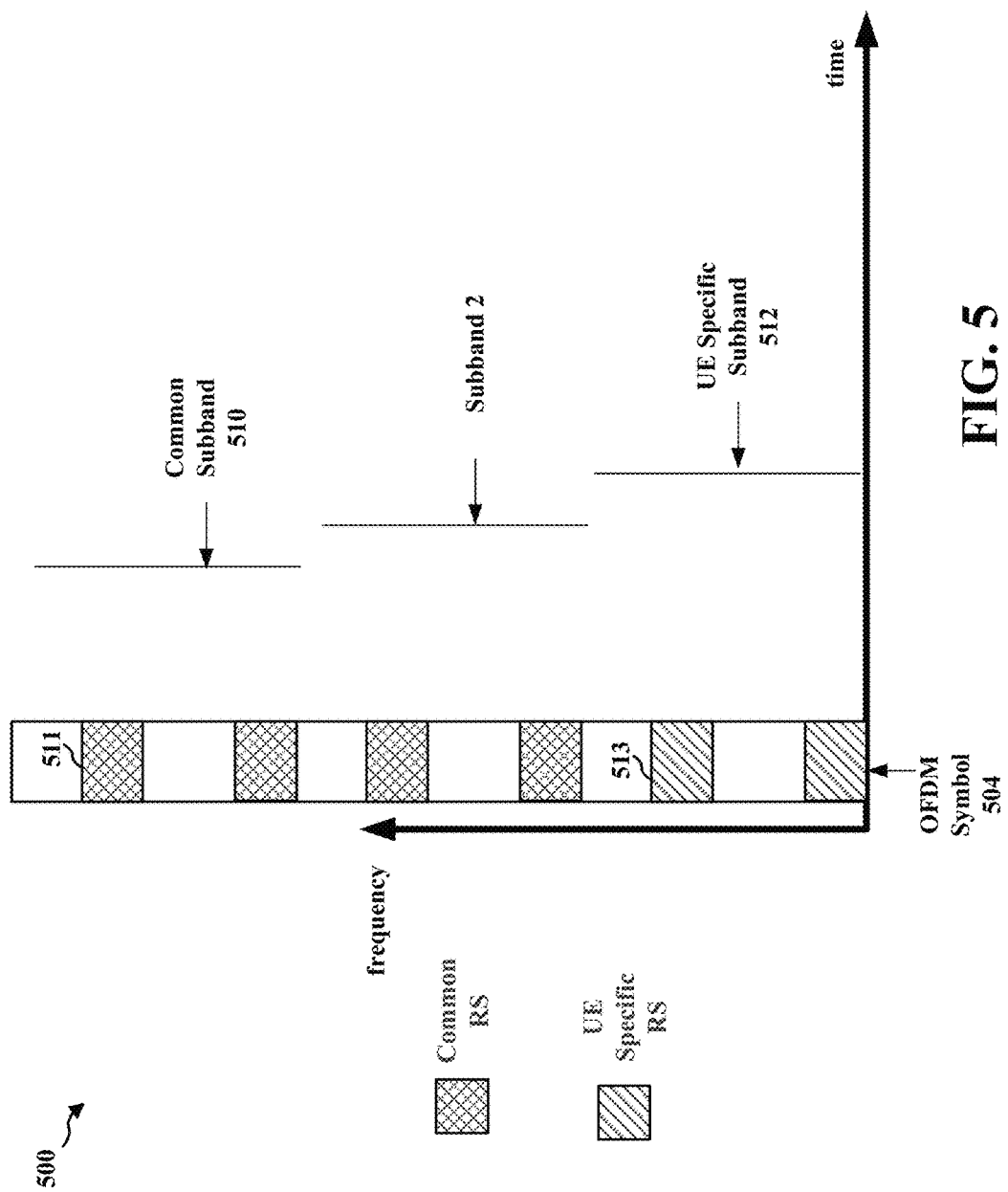
FIG. 5 is a diagram illustrating example RS placement in different subbands of an OFDM symbol.

For example, within the same OFDM symbol there may be different resource sets located in different subbands of the OFDM symbol. FIG. 5 illustrates a frame structure example 500 having a common resource set within subband 510 and a UE specific resource set within subband 512 within OFDM symbol 504. The common resource set and the UE specific resource set are located in different subbands within each OFDM symbol. A common RS 511 may be transmitted by a base station or other access point within common resource set of subband 510, and a UE specific RS 513 may be transmitted by the base station or other access point within the UE specific RS 512. Both resource sets, i.e., the common resource set 510 and the UE specific resource set of subband 512, may be within a control region of an OFDM system bandwidth.

The location of the RS within the OFDM symbol may be based on an identifier. For example, the location of the RS within the OFDM symbol may be a function of an identifier for the base station or access point transmitting the RS on, e.g., a function of, an identifier. Among other types of identifiers, the identifier may comprise a cell ID of the base station or access point. In one example, the identifier may comprise a virtual cell ID. The UE may be aware of the cell identifier, e.g., by extracting the cell identifier from a PSS, SSS, etc. In another example, dedicated signaling may be used to provide a cell identifier, e.g., in a handover. Alternately, the location of the RS within the OFDM symbol may be independent of a cell ID. As presented herein, within one OFDM symbol, e.g., 404*a,b* or 504, RS placement design may be different for different resource sets on different subbands. This is different than for LTE, in which RS placement is either cell ID dependent or cell ID independent within an OFDM symbol.

For example, for a common resource set (e.g., 510) RS tone location may be cell ID dependent. The common RS 511 may include information directed to a number of UEs within the coverage of the cell. Common RS placement as a function of cell ID may provide better channel estimation and measurements for UEs at cell edges from an interference standpoint. As the common RS placement is dependent on cell ID, neighbor cells will likely have different RS placement due to their different cell IDs. When neighbor cells are partially loaded, e.g., only transmitting common RS, the UE is less likely to experience interference from a neighbor cell's common RS while the UE attempts to receiving the common RS for its serving cell. The interference caused by the neighbor cell's common RS may be avoided because the placement will likely be different for the different cells due to their different cell IDs.

In another example, certain common RS may be cell ID dependent, while other common RS may be cell ID independent. In order to inform the UE whether the location of the common RS within the common resource set is dependent or independent of cell ID, the base station or access point may transmit an indication in a Master Information Block (MIB) or Minimum System Information Block (MSIB) as to whether the placement of the common RS within the common resource set is cell ID dependent or cell ID independent. For example, for a common resource set that comprises a sub-6 carrier frequency, e.g., below 6 GHz, the common RS may be cell ID independent. The base station may transmit an indication in the MIB/MSIB indicating that the common RS is cell ID dependent, or may refrain from sending an indication that the common RS is independent of cell ID. For common resource sets having a mmWave carrier frequency, the common RS mapping may be cell ID independent. The base station may transmit an indication in the MIB/MSIB indicating that the common RS is cell ID independent, or may refrain from sending an indication that the common RS is dependent on cell ID. Therefore, a UE receiving the common RS may determine whether the common RS location is dependent on cell ID through MIB/MSIB signaling from the base station. In another example, the UE may determine whether the common RS location is dependent on cell ID based on the carrier frequency of the common resource set.

In another example, the dependence of cell ID for the location of the RS may depend on whether data will likely be sent with the RS. For example, if the common RS is sent with data, as with a UE specific RS, then colliding RS tones may be beneficial, and the placement may be cell ID independent. However, if the RS will be sent without data, then a non-colliding RS may be preferable, and the placement may be a function of cell ID.

In another example, a mobility reference signal, a beam training signal, or a refinement signal may comprise an RS placement that is dependent on an identifier of the transmitting base station. The RS mappings may be dependent on an identifier, such as a cell ID, a virtual cell ID, a measurement ID, or a symbol index, among others. By mapping such signals as a function of an identifier may increase reuse factor of those signals, and due to a tone offset with similar neighbor cell transmissions.

A UE specific RS 513 in the UE specific resource set 512 may have a placement that is independent of the cell ID of the base station or access point transmitting the UE specific RS. Data and pilot information may likely be transmitted together for the UE specific RS. Having such UE specific RS in the same location as UE specific RS for neighbor cells may be beneficial. For example, having the same tone location may benefit interference cancellation techniques.

Therefore, the UE may identify the common resource set, e.g., 510, comprising a first control resource set within a plurality of subbands of within one OFDM symbol transmitted by an access point. The plurality of subbands may be within a control region of the OFDM symbol. The UE may then determine whether a common RS tone location utilized with that first control resource set is dependent upon an a cell ID of the access point. The UE may determine the dependence either from an MIB/MSIB signal indicating the dependence or may make the determination based on the carrier frequency of the first control resource set. After determining the dependence on cell ID, the UE can use the determination to receive the common RS. The UE may also determine a cell identifier dependent shift for RS tone locations of the common RS in order to receive the common RS. The UE may then identify a second control resource set comprising a second subband in the plurality of subbands. The UE may make the identification based at least in part on a message decoded from the common RS. The second control resource set may comprise a UE-specific search space. Thus, the UE may use a grant from the common RS to determine UE specific RS locations in the UE specific search space. This determination may be independent of a cell identifier.

In another example, the RS may comprise a PBCH RS and a PDSCH RS. For example, the resource set used to transmit the PBCH RS may be cell ID dependent and within the same subframe a PDSCH DMRS on a second resource set may be either cell ID independent. A PDSCH DMRS may also be cell ID dependent, in another example.

Additionally, the resource sets may comprise a frequency shift. Thus, within a single subframe, one reference signal may have no cell ID dependent frequency shift, while another reference signal has an applied frequency shift that is based on a cell ID of the base station transmitting the reference signal. The reference signals may correspond to different resource sets, e.g., different subbands. Thus, a first subband may comprise reference signals without frequency shift and reference signals in another subband may be transmitted based on a cell ID dependent frequency shift.

In one example, a PDSCH DMRS may be transmitted without a cell ID dependent frequency shift, and within the same subframe, a PBCH RS may be transmitted having a frequency shift that is cell ID dependent. PDSCH DMRS may be transmitted based on a comb structure. As another example, in one resource set, PDSCH RS may be transmitted without cell ID dependent frequency shift, and in another resource set in the same subframe, PDSCH RS may be transmitted with a cell ID dependent frequency shift. The frequency shift may also enhance DMRS detection by minimizing a collision with another cell DMRS. The cell ID dependent frequency shift minimizes situations in which cross-correlation between sequences are high.

A first PDSCH DMRS position may be a fixed or preset positions. For example, a first PDSCH DMRS position may be fixed/preset at the $3^{rd}$ or $4^{th}$ symbol of a slot. A PBCH symbol may be located at a $4^{th}$ symbol, or other symbols, within a slot. For an example of two PBCH symbols within a Synchronization Signal (SS) SS block, the transmissions may be configured as PSS-PBCH-SSS-PBCH. A cell ID based frequency shift may be applied to PBCH RS resource element locations. For example a frequency shift $v_{shift}$ may be based on $v_{shift} = N_{ID\,cell}$ cell mod 4, where $N_{IDcell}$ indicates a n index based on a cell ID of the base station transmitting the PBCH RS.

The frequency shift may minimize collision with another cell's CRS, PBCH RS, or DMRS and enhance detection. The cell ID dependent frequency shift to different tones may help to avoid overlap between sequences by providing additional randomization. For example, at times, a reference signal may be configured to carry information. Neighboring cells may have high cross correlation between their reference signals, which may degrade the ability of a user equipment to determine the information indicated by a particular reference signal. Through the use of a cell dependent frequency shift, additional randomization may be enabled in the reference signal. Such randomization may reduce situations of cross-correlation between reference signal sequences of neighboring cells.

As another example, a cell ID dependent frequency shift may be applied to a CRS and within the same subframe, a UE-RS may be transmitted without a frequency shift. For example, a CRS may be transmitted on tones 0, 3, 6, 9, . . . . A frequency shift may be applied, e.g., based on a cell identifier. For example, based on the cell ID, a frequency shift of "1" may be indicated. Thus, the CRS would be transmitted on tones 1, 4, 7, 10, . . . instead of 0, 3, 6, 9, . . . .

Figure 13:
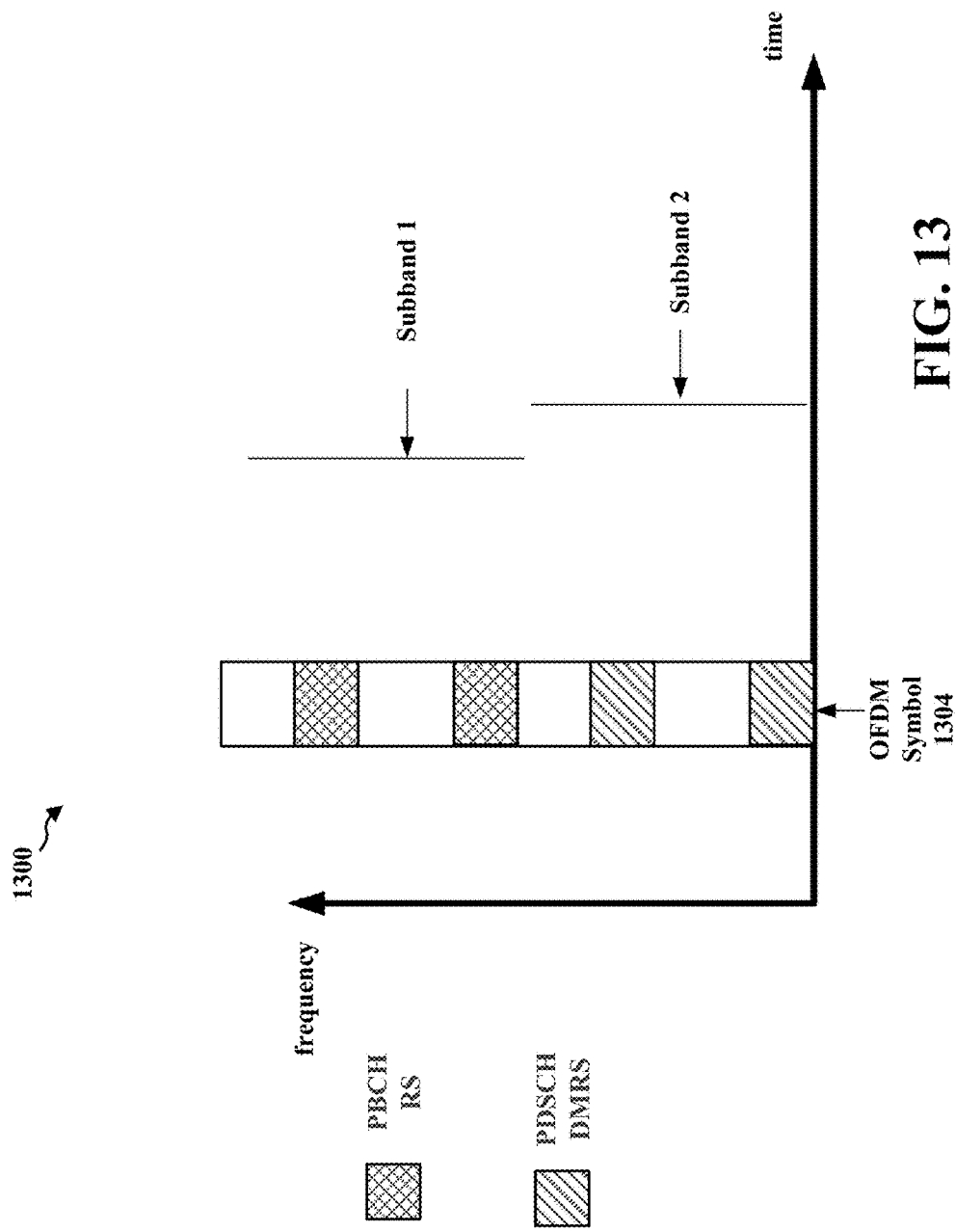
FIG. 13 is a diagram illustrating example RS placement in different subbands of an OFDM symbol.

FIG. 13 illustrates an example 1300 of two different subbands of a single OFDM symbol 1304 that comprises both a PBCH RS and a PDSCH DMRS. The PDSCH DMRS may be transmitted without a frequency shift, e.g., at set locations. The PBCH RS may have a frequency shift that is dependent on cell ID or virtual cell ID. This cell ID dependent frequency shift helps to prevent cross correlation between the PDSCH DMRS and the PBCH RS.

Figure 14:
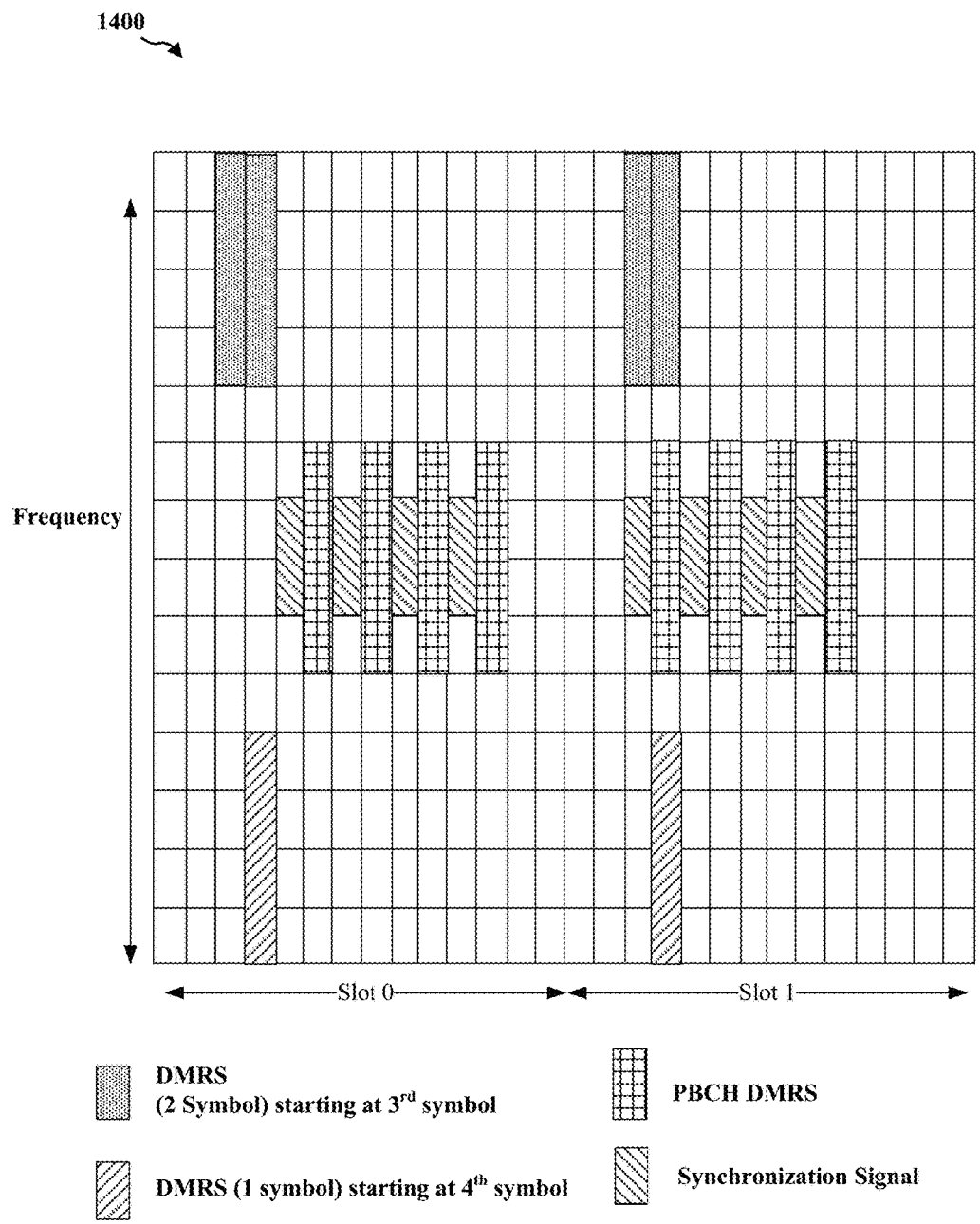
FIG. 14 is a diagram illustrating example RS placement for DMRS and PBCH DMRS.

For a 15 kHz subcarrier spacing, two SS block candidate locations may be mapped to a slot of 14 symbols with a first candidate location at symbols 2-5 and a second candidate location at symbols 8-11. For a 30 kHz subcarrier spacing, two SS block candidate locations may be mapped to a slot of 14 symbols with a first candidate location at symbols 2-5 and a second candidate location at symbols 8-11. FIG. 14 illustrates an 120 kHz example 1400 that illustrates an overlap of PDSCH DMRS without a frequency shift and PBCH DMRS with a frequency shift. In FIG. 14, PDSCH DMRS and PBCH DMRS are in the same symbol in slot 1 but not for slot 0. As illustrated, a 2 symbol PDSCH DMRS may start in a third symbol and a 1 symbol PDSCH DMRS starting in a fourth symbol collide with the PBCH DMRS on slot 1. Additional collisions may occur for non-front-loaded DMRS. The SS may comprise PSS or SSS for example. FIG. 14 illustrates an example PBCH-SS-PBCH-SS placement, in which a PBCH is transmitted in a symbol, followed by an SS in the next symbol, a PBCH in the symbol following the SS, and another SS in the symbol following the second PBCH. For a 120 kHz subcarrier spacing, the first OFDM symbols of the candidate SS/PBCH blocks may have indexes {4, 8, 16, 20}+28*n. For carrier frequencies larger than 6 GHz, n may equal 0, 1, 2, 3, 5, 6, 7, 8, 10, 11, 12, 13, 15, 16, 17, 18.

Figure 6:
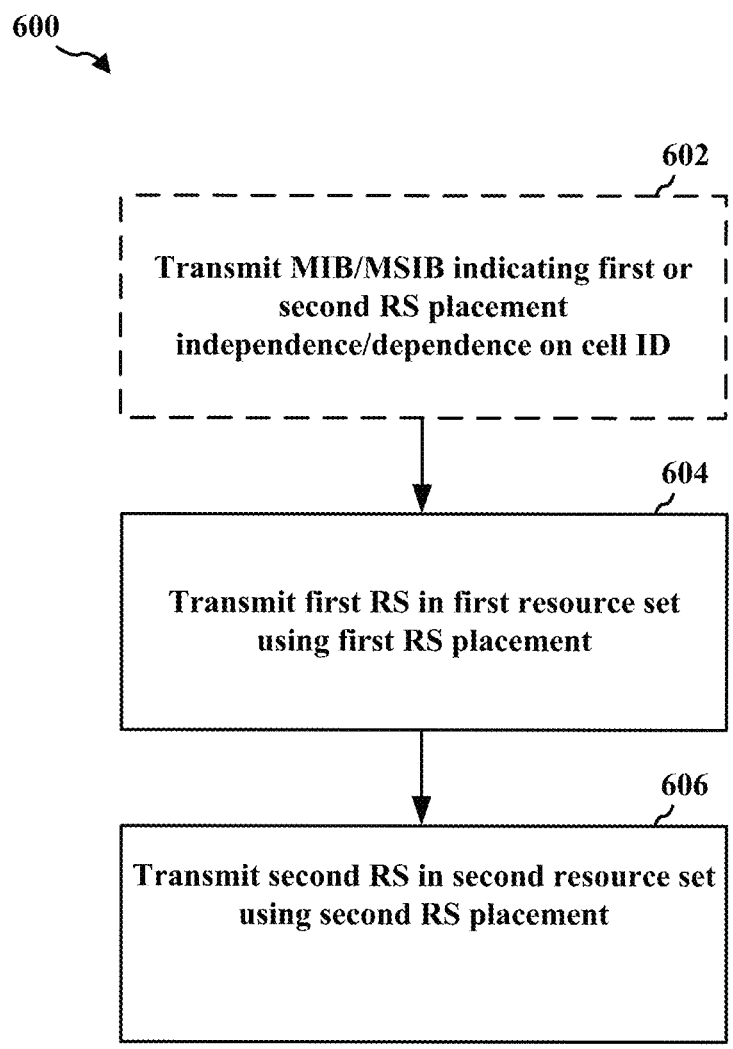
FIG. 6 is a flowchart of a method of wireless communication.

FIG. 6 is a flowchart 600 of a method of wireless communication. The method may be performed by an base station or other access point (e.g., the base station 102, eNB 310, the apparatus 702/702'). At 604, the base station transmits a first RS in a first control resource set using a first RS placement, wherein the first resource set comprises a first subband of an OFDM symbol, e.g., as described in connection with FIGS. and 5. The first RS placement in the first resource set may be dependent on identifier cell ID corresponding to the base station. In one example, the cell ID may comprise a virtual cell ID. The base station may optionally transmit a MIB/MSIB indicating that the first RS placement for the common RS is dependent on the cell ID corresponding to the base station, as indicated at 602. Optional aspects of FIG. 6 are illustrated using a dashed line.

At 606, the base station transmits a second RS in a second resource set using a second RS placement, wherein the second resource set comprises a second subband of the OFDM symbol. The second RS placement in the second control resource set may be independent of the cell ID corresponding to the base station.

In a first example, the first RS may comprise a CRS and the second RS may comprise a UE-RS. For example, the base station may transmit a CRS in the first subband using a first RS placement that is dependent on the cell ID, and may transmit a UE-RS in the second subband using a second RS placement that is independent of cell ID.

In another example, the first RS may comprise a first CRS and the second RS may comprise a second CRS. The dependence/independence of the second RS placement for the second CRS may be based on the carrier frequency used to transmit the second RS. At 602, the base station may transmit a MIB/MSIB indicating that the second RS placement for the second CRS is independent of the cell ID corresponding to the base station.

In another example, the first RS may comprise at least one of a mobility reference signal, a beam training signal, and a refinement signal. The first RS placement in the first subband may comprise a mapping dependence on an cell ID corresponding to the base station. In one example, the cell ID may comprise a virtual cell ID, or a measurement ID. The mapping may be further dependent on a symbol index.

In another example, the first RS may comprise a PBCH RS and the second RS may comprise a PDSCH DMRS. The first RS placement, for the PBCH RS, that is dependent on the cell ID corresponding to the base station may comprise a frequency shift that is dependent on a cell ID of the base station. The PDSCH DMRS may be transmitted at fixed or preset locations, without a frequency shift.

Figure 7:
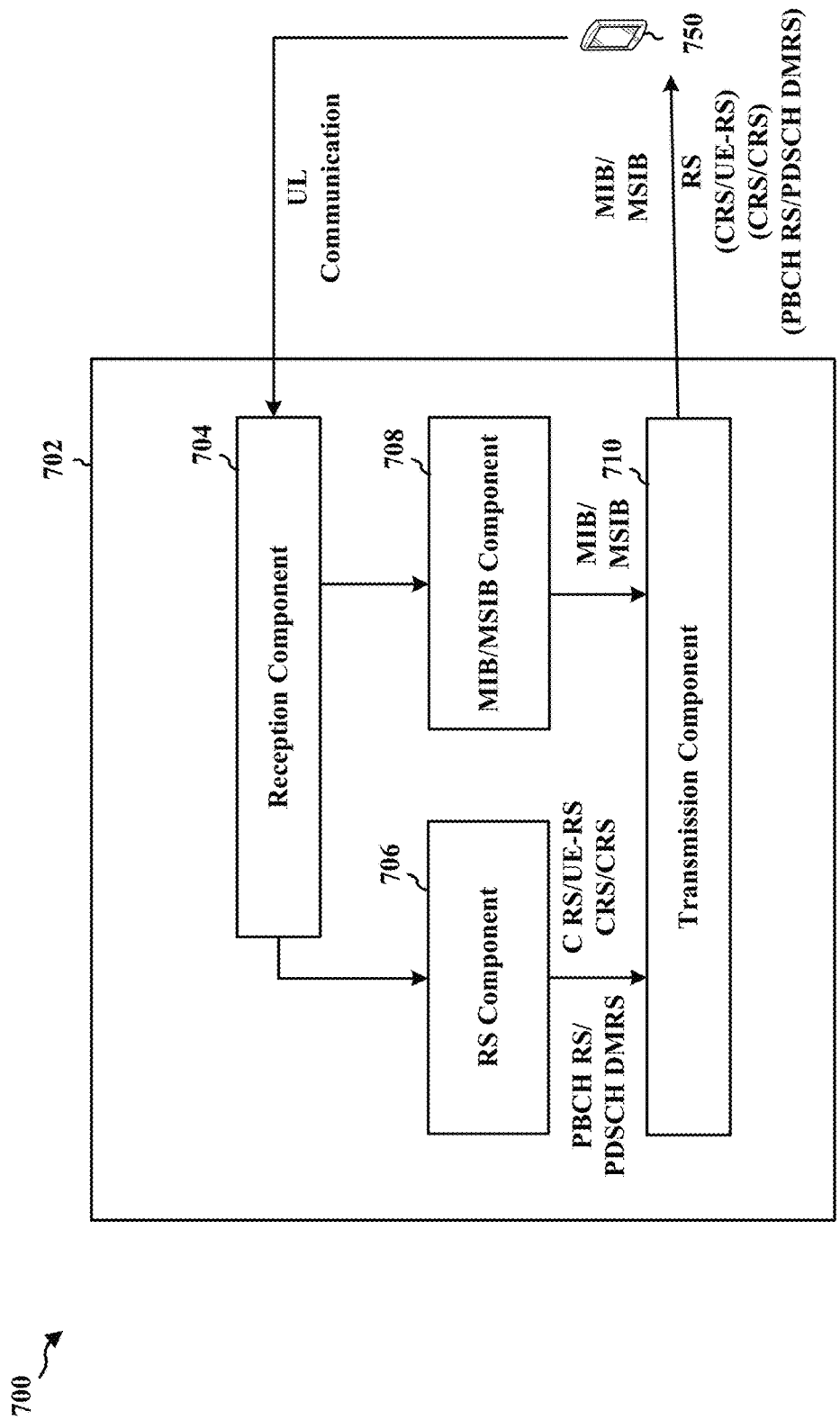
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a base station (e.g., base station 102, eNB 310). The apparatus includes a reception component 704 that receives UL communication from a UE and a transmission component 710 that transmits DL communication to the UE 750, including common RS and UE specific RS. The transmission component 710 may also transmit an MIB/MSIB. The apparatus includes an RS component 706 configured to transmit a first RS in a first resource set using a first RS placement, wherein the first resource set comprises a first subband of an OFDM and to transmit a second RS in a second resource set using a second RS placement, wherein the second resource set comprises a second subband of the OFDM symbol, as described in connection with FIG. 6. The RS component may transmit the RS via the transmission component 710. The apparatus may also include an MIB/MSIB component 708 that transmits, via the transmission component 710, an MIB/MSIB that comprises an indication of whether a location of the RS is independent of/dependent on a cell ID.

Figure 8:
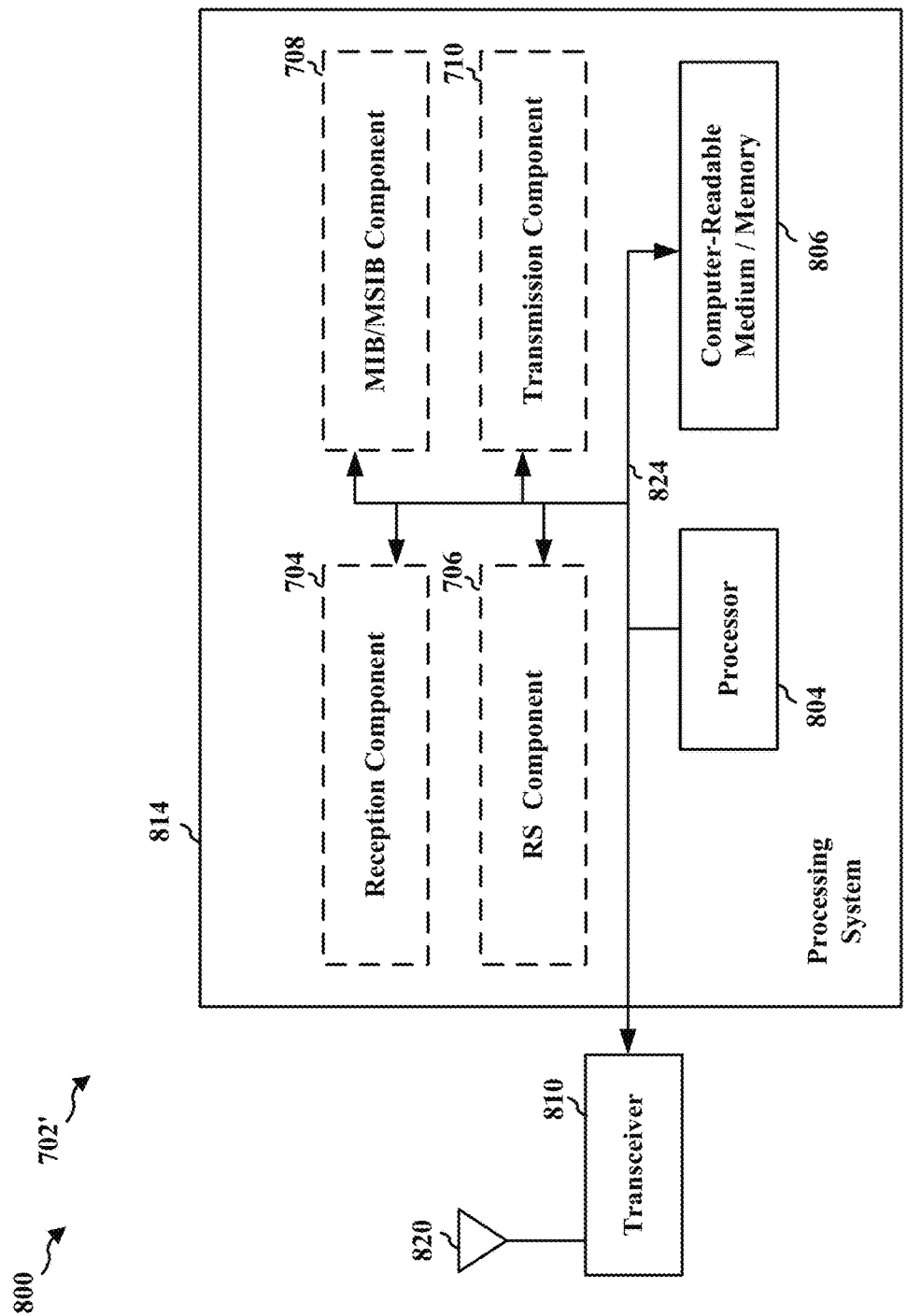
FIG. 8 is a diagram illustrating an example of a hardware implementation for an apparatus employing a processing system.

The apparatus may include additional components that perform each of the blocks of the algorithm in the aforementioned flowcharts of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710. The components may be software components running in the processor 804, resident/stored in the computer readable medium/memory 806, one or more hardware components coupled to the processor 804, or some combination thereof. The processing system 814 may be a component of the eNB 310 and may include the memory 376 and/or at least one of the TX processor 316, the RX processor 370, and the controller/processor 375.

In one configuration, the apparatus 702/702' for wireless communication includes means for transmitting (e.g., 706, 710) a first RS in a first resource set using a first RS placement, wherein the first resource set comprises a first subband of an OFDM symbol; means for transmitting (e.g., 706, 710) a second RS in a second resource set using a second RS placement, wherein the second resource set comprises a second subband of the OFDM symbol, and means for transmitting (e.g., 708, 710) an MIB/MSIB indicating that the RS placement for a common RS is independent/dependent on the cell ID corresponding to the base station. The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
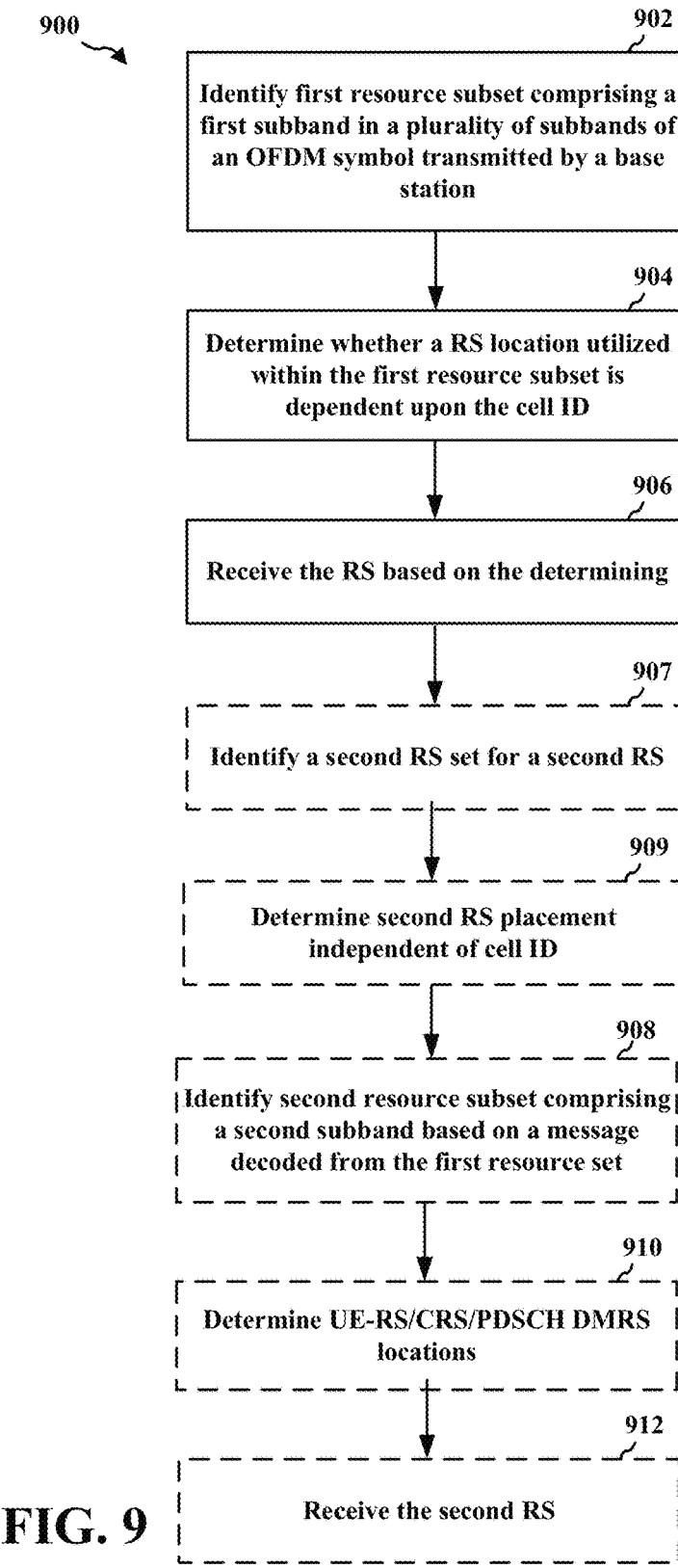
FIG. 9 is a flowchart of a method of wireless communication.

FIG. 9 is a flowchart 900 of a method of wireless communication. The method may be performed by a UE (e.g., the UE 104, 350 the apparatus 1002/1002'). At 902, the UE identifies a first resource set comprising a first subband in a plurality of subbands of an OFDM symbol transmitted by an base station, e.g., as described in connection with FIGS. 4 and 5. The first OFDM symbol may comprise a control region and the plurality of subbands may include a common search space and at least one UE-specific search space. In another example, the first resource set may be used to transmit other RS, e.g., PBCH RS, PDSCH DMRS, etc.

At 904, the UE determines whether a RS placement, e.g., a tone location, utilized with the first resource set is dependent upon a cell ID of the base station. In one example, the cell ID may comprise a virtual cell ID. In one example, the first resource set may comprise the common search space, and the RS may comprise a CRS. The determining at 904 may be based at least in part on a master information block or a system information block message. In another example, the determining at 904 may be based at least in part on a carrier frequency used by the base station. In another example, the RS may comprise a CRS and the determining at 904 may comprise determining a cell ID dependent shift for RS placement of the CRS.

In another example, the resource set may be used to transmit a PBCH RS that has an RS placement that is dependent on the cell ID of the base station. For example, the PBCH RS may comprise a cell ID dependent frequency shift.

At 906, the UE receives the RS, e.g., CRS, UE-RS, PBCH RS, or PDSCH DMRS, based on a result of the determining at 904.

The UE may optionally further identify a second resource set comprising a second subband in the plurality of subbands at 907. At 909, the UE may determine a second RS placement for the second RS independent of the cell ID of the base station. The RS placement for the first RS may be determined based on a frequency shift dependent on a cell ID of the base station and the second RS placement for the second RS is determined without a cell ID dependent frequency shift.

The second resource set may be identified based at least in part on a message decoded from the first resource set at 908. The second resource set may comprise, e.g., a UE-specific search space, and the UE may further determine, based on the message, UE-specific RS locations in the UE-specific search space at 910. The UE-specific RS locations in the UE-specific search space may be independent of the identifier. Then, at 912, the UE may receive the UE-specific RS based on the determination at 910. Thus, in this example, the UE may receive a CRS having an RS placement that is dependent on cell ID/virtual cell ID and a UE-RS having a different RS placement that is independent of cell ID/virtual cell ID within a same symbol. In another example, both RS may comprise CRS, a first CRS having an RS placement that is dependent on cell ID/virtual cell ID and a second CRS having a different RS placement that is independent of cell ID/virtual cell ID within a same symbol. For example, CRS in different carrier frequencies may have RS placements with different dependence/independence of cell ID. Thus, the second resource set identified at 908 may comprise a second CRS, and the UE may determine a position of the second CRS at 910.

In another example, the UE may receive, in the same symbol, a PBCH RS having a cell ID dependent frequency shift and a PDSCH DMRS without a cell ID dependent frequency shift. Thus, the second resource set identified at 908 may correspond to a PDSCH DMRS. At 910, the UE may determine the RS placement of the PDSCH RS, e.g., without the frequency shift dependent on cell ID.

Figure 10:
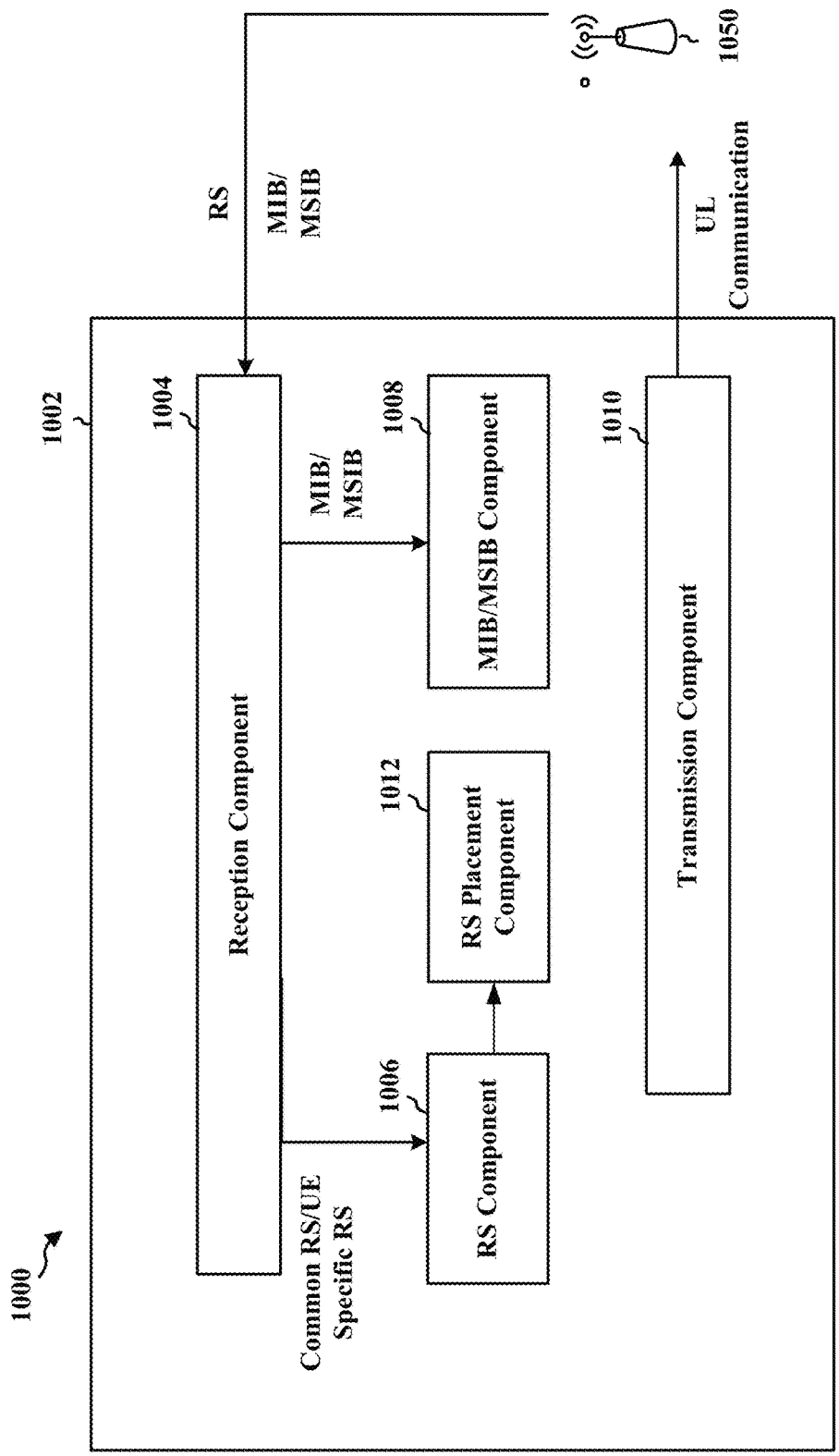
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes an RS component 1006 that identifies a first resource set comprising a first subband in a plurality of subbands of an OFDM symbol transmitted by a base station and an RS placement component 1012 that determines whether an RS placement utilized with the first resource set is dependent upon cell ID of the base station, and a reception component 1004 that receives RS from the base station 1050. The RS component 1006 may also be configured to identify a second resource set comprising a second subband in the plurality of subbands, and the RS placement component 1012 may be configured to determine a second RS placement for a second RS, as described in connection with FIG. 9. The apparatus may also include a transmission component 1010 that transmits UL communication to the base station and/or an MIB/MSIB component 1008 that receives information regard whether the RS is dependent upon the cell identifier of the base station in an MIB/MSIB.

The apparatus may include additional components that perform each of the blocks of the algorithm in the aforementioned flowcharts of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
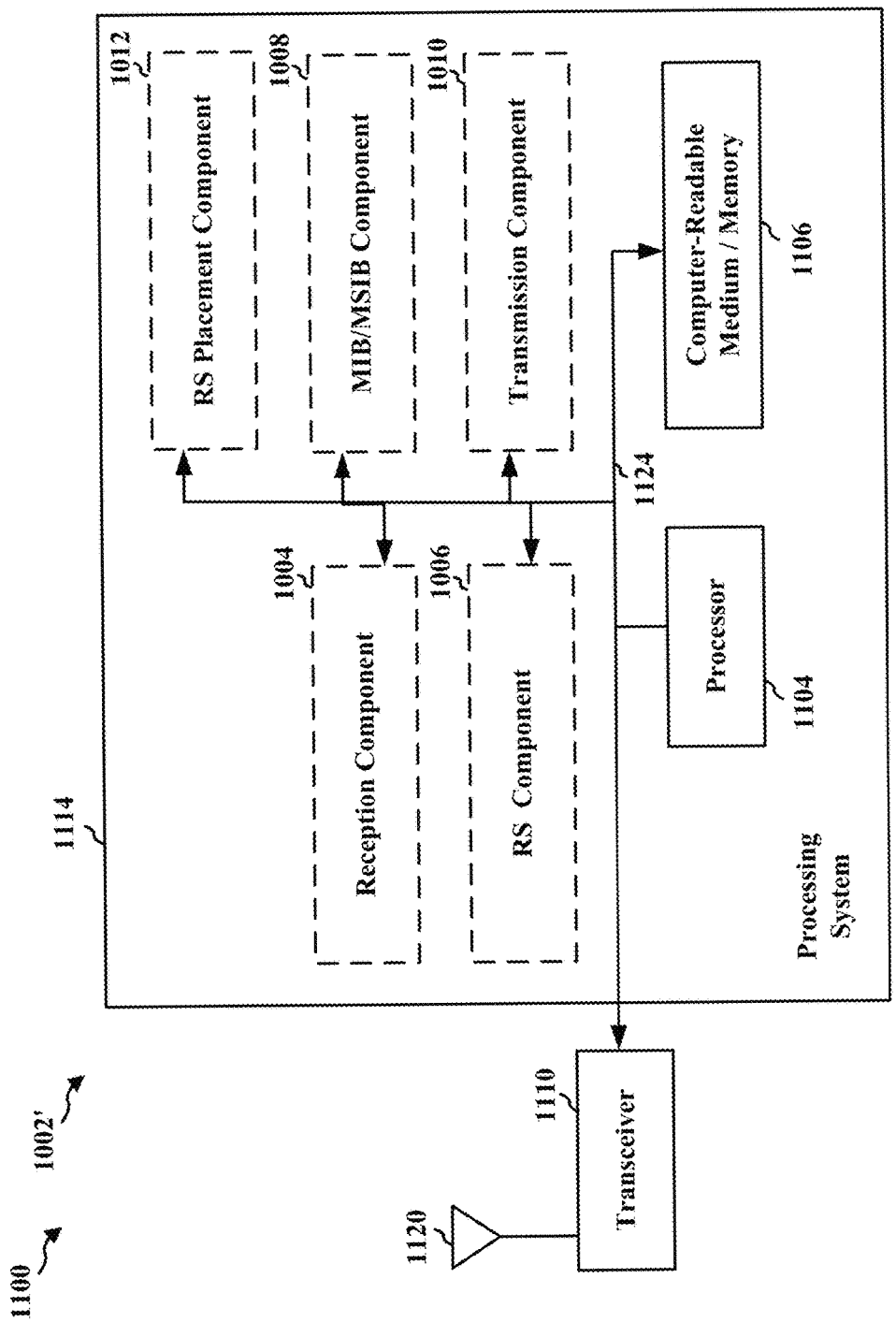
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for identifying (e.g., 1006) a first resource set comprising a first subband and a second resource set comprising a second subband in a plurality of subbands of an OFDM symbol transmitted by a base station; means for determining whether a RS placement (e.g., 1012) utilized with the first subband is dependent upon identifier cell ID of the base station; means for receiving (e.g., 1004) the RS based on a result of the determining; means for determining (e.g., 1012) RS locations for a second RS independent of a cell ID of the base station; and means for determining (e.g., 1012) UE-specific RS locations in the UE-specific resource set independent of the cell ID; and means for receiving (e.g., 1004) the RS. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   transmitting a first reference signal (RS) from the base station to a User Equipment (UE) in a first subband comprised in a plurality of subbands of an orthogonal frequency division multiplexed (OFDM) symbol using a first RS placement that is dependent on a cell identifier (cell ID) corresponding to the base station; and
   transmitting a second RS from the base station to the UE in a second subband comprised in the plurality of subbands of the OFDM symbol using a second RS placement that is independent of the cell ID corresponding to the base station, wherein the second RS comprises a UE specific RS,
   wherein the first subband and the second subband each comprise contiguous subcarriers of the OFDM symbol, wherein the first subband is different than the second subband.

2. The method of claim 1, wherein the cell ID comprises a virtual cell ID.

3. The method of claim 1, further comprising:
   transmitting a master information block (MIB) or a master system information block (MSIB) indicating that the first RS placement is dependent on the cell ID corresponding to the base station.

4. The method of claim 1, wherein the first RS comprises a first common RS (CRS).

5. The method of claim 4, wherein the second RS placement for the second RS is based on a carrier frequency used to transmit the second RS.

6. The method of claim 4, further comprising:
transmitting a master information block (MIB) or a system information block (SIB) indicating that the second RS placement for the second RS is independent of the cell ID corresponding to the base station.

7. The method of claim 1, wherein the first RS comprises at least one of a mobility reference signal, a beam training signal, and a refinement signal.

8. The method of claim 7, wherein the cell ID comprises at least one of a virtual cell ID, or a measurement ID.

9. The method of claim 7, wherein the first RS placement is further dependent on a symbol index of the OFDM symbol.

10. The method of claim 1, further comprising:
transmitting a third RS that is different than the first RS and the second RS, wherein the third RS comprises a channel state information reference signal (CSI-RS).

11. The method of claim 1, wherein the UE specific RS is associated with a data transmission from the base station to the UE.

12. The method of claim 1, wherein the second RS is sent with data for the UE.

13. The method of claim 12, wherein the UE specific RS corresponds to a pilot that is received from the base station together with the data for the UE.

14. An apparatus for wireless communication at a base station comprising:
a memory; and
at least one processor coupled to the memory and configured to cause the apparatus to:
transmit a first reference signal (RS) from the base station to a User Equipment (UE) in a first subband comprised in a plurality of subbands of an orthogonal frequency division multiplexed (OFDM) symbol using a first RS placement that is dependent on a cell identifier (cell ID) corresponding to the base station; and
transmit a second RS from the base station to the UE in a second subband comprised in the plurality of subbands of the OFDM symbol using a second RS placement that is independent of the cell ID corresponding to the base station, wherein the second RS comprises a UE specific RS,
wherein the first subband and the second subband each comprise contiguous subcarriers of the OFDM symbol, wherein the first subband is different than the second subband.

15. The apparatus of claim 14, wherein the at least one processor is further configured to cause the apparatus to transmit at least one of a master information block (MIB) or a master system information block (MSIB) indicating that the first RS placement for the first RS is dependent on the cell ID corresponding to the base station.

16. The apparatus of claim 14, wherein the at least one processor is further configured to cause the apparatus to transmit at least one of a master information block (MIB) or a system information block (SIB) indicating that the second RS placement for the second RS is independent of the cell ID corresponding to the base station.

17. The apparatus of claim 14, wherein the at least one processor is further configured to cause the apparatus to:
transmit a third RS that is different than the first RS and the second RS, wherein the third RS comprises a channel state information reference signal (CSI-RS).

18. The apparatus of claim 14, wherein the UE specific RS is associated with a data transmission from the base station to the UE.

19. The apparatus of claim 18, wherein the UE specific RS corresponds to a pilot that is received from the base station together with the data transmission for the UE.

20. A method of wireless communication at a user equipment (UE) comprising:
identifying a first subband comprised in a plurality of subbands of an orthogonal frequency division multiplexed (OFDM) symbol for a first reference signal (RS) transmitted by a base station;
determining a first RS placement for the first RS in the first subband comprised in the plurality of subbands of the OFDM symbol, wherein the first RS placement is dependent upon a cell identifier (cell ID) of the base station;
receiving the first RS from the base station based on the first RS placement determined by the UE;
identifying a second subband in the plurality of subbands of the OFDM symbol for a second RS;
determining a second RS placement for the second RS in the second subband comprised in the plurality of subbands of the OFDM symbol, wherein the second RS placement is independent of the cell ID of the base station, and wherein the second RS comprises a UE specific RS; and
receiving the second RS from the base station based on the second RS placement determined by the UE,
wherein the first subband and the second subband each comprise contiguous subcarriers of the OFDM symbol, wherein the first subband is different than the second subband.

21. The method of claim 20, wherein the first RS comprises a common RS.

22. The method of claim 20, further comprising:
receiving a third RS that is different than the first RS and the second RS, wherein the third RS comprises a channel state information reference signal (CSI-RS).

23. The method of claim 20, wherein the UE specific RS is associated with a data transmission from the base station to the UE.

24. The method of claim 20, wherein the UE specific RS is received together with data for the UE.

25. The method of claim 24, wherein the UE specific RS corresponds to a pilot that is received from the base station together with the data for the UE.

26. The method of claim 20, further comprising:
receiving a third RS that is different than the first RS and the second RS, wherein the third RS comprises a channel state information reference signal (CSI-RS).

27. An apparatus for wireless communication, comprising:
a memory; and
at least one processor coupled to the memory and configured to cause the apparatus to:
identify a first subband in a plurality of subbands of an orthogonal frequency division multiplexed (OFDM) symbol for a first reference signal (RS) transmitted by a base station;
determine a first RS placement for the first RS in the first subband comprised in the plurality of subbands of the OFDM symbol, wherein the first RS placement is dependent upon a cell identifier (cell ID) of the base station;
receive the first RS from the base station based on the first RS placement determined by the UE;
identify a second subband in the plurality of subbands of the OFDM symbol for a second RS;

determine a second RS placement for the second RS in the second subband comprised in the plurality of subbands of the OFDM symbol, wherein the second RS placement is independent of the cell ID of the base station, and wherein the second RS comprises a UE specific RS; and receive the second RS from the base station based on the second RS placement determined by the UE, wherein the first subband and the second subband each comprise contiguous subcarriers of the OFDM symbol, wherein the first subband is different than the second subband.

28. The apparatus of claim 27, wherein the UE specific RS is associated with a data transmission from the base station to the UE.

29. The apparatus of claim 28, wherein the UE specific RS corresponds to a pilot that is received from the base station together with the data transmission for the UE.

* * * * *